Sept. 9, 1947.    A. MORPETH    2,427,298
SHADE ROLLER
Filed Feb. 9, 1945
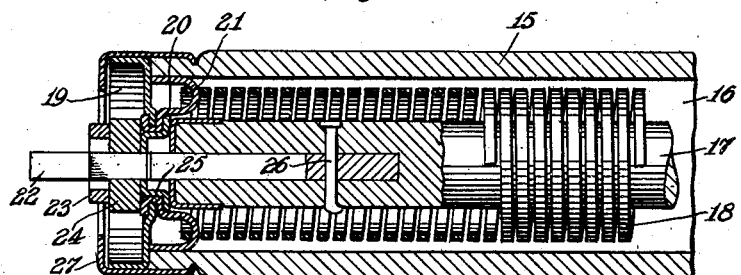
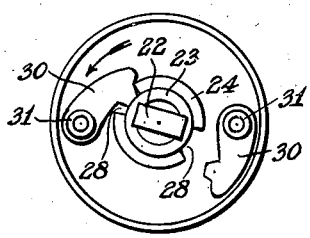 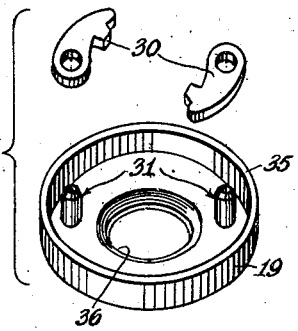
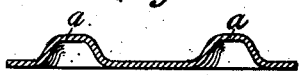 
 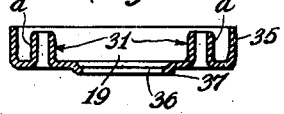
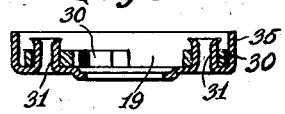
INVENTOR.
ANTHONY MORPETH
BY
*Williams, Rich & Morse*
ATTORNEYS Patented Sept. 9, 1947

2,427,298

UNITED STATES PATENT OFFICE 2,427,298

SHADE ROLLER

Anthony Morpeth, Muskegon, Mich., assignor to Stewart Hartshorn Company, New York, N. Y., a corporation of New Jersey Application February 9, 1945, Serial No. 577,049

4 Claims. (Cl. 160—323)

This invention relates to spring shade rollers of the type having a stationary, notched hub about which rotates a pawl-carrying member affixed to the roller, the pawls serving to maintain the shade in its adjusted position by dropping into the uppermost notch in the hub under the influence of gravity.

In shade rollers of this almost universally used type, it has long been the practice to mount the pawls in the pawl-carrying member, referred to herein as the "spool" by means of rivets inserted through holes in the pawls and in the spool and headed up on the outside of the spool to retain the pawls in place. The rivets are adapted to provide a loose bearing for the pawls, so that they will readily fall by gravity.

This assembly of the rivets and pawls to the spool is the most difficult and time-consuming operation in the manufacture of this part of shade roller mechanism because it is of necessity a hand operation and the pawls and rivets are very small and difficult to handle.

The principal objects of the present invention are to eliminate the use of separate rivets for securing the pawls to the spool; to provide a spool with integral pivots; to provide pivots for the pawls which are of great strength and durability; to provide a spool with which the pawls can be assembled by automatic machinery; and to provide tubular pivots for the pawls which can be expanded or flared at their outer ends to hold the pawls in place.

Other objects and advantages will in part appear and in part will be apparent from the following detailed description of the present preferred embodiment of the invention, taken in conjunction with the drawings in which:

Fig. 1 is a longitudinal sectional view through the end of a spring shade roller of one type to which the invention applies;

Fig. 2 is an end view of the roller of Fig. 1 with the ferrule removed;

Fig. 3 is an exploded perspective showing the spool and pawls before assembly;

Figs. 4, 5, 6 and 7 are central sections showing successive stages in the formation of the spool of the invention; and Fig. 8 is a central section through the spool showing the pawls secured in place.

Referring to Fig. 1, one end of a spring shade roller of the type described in Watts U. S. Patent No. 1,942,787 of January 9, 1934, is illustrated. It comprises a roller 15 having a central bore 16 to receive a spindle 17 and an actuating spring 18. The spool 19 is positioned on the open end of the roller and has attached to it and extending into the bore a spindle bearing 20 which has a central cup-shaped portion, the edge of which is crimped in a central opening in the spool 19, and integral loops 21 through which one end of spring 18 passes and in which it is held by bending up one end of the spring as shown in Hartshorn U. S. Patent 466,413 of January 5, 1892. The other end of spring 18 is fastened to the inner end of spindle 17 in the conventional manner by passing the end of the spring through a slot in the spindle as shown in Hartshorn U. S. Patent 1,093,931 of April 21, 1914. A shouldered spear 22 has assembled thereon a spacer 23 and ratchet-hub 24, which are inside of spool 19, and a flanged bearing cup 25 which extends into the bearing 20 from the other side of the spool. The bearing cup 25 is fastened to the spear by upsetting some of the metal of the spear against it and the spear is held in the spindle 17 by a pin 26. This entire assembly is secured in the roller by a ferrule 27 which has its edge rolled inwardly at 27' to grip the roller.

In use, the spear 22 and all parts secured thereto are held stationary by the supporting bracket and the spool assembly and roller rotate thereabout. The ratchet-hub 24, being fast to the spear, is held stationary with one of the notches 28 uppermost so that one or the other of the pawls 30 can drop into it to hold the roller immobile. In stopping the roller suddenly, particularly when the spring is under nearly full tension as when the shade is near its completely unwound position, the pivots 31 which support the pawls may be subjected to considerable shock and must therefore have sufficient strength to withstand the blows to which they are subjected without giving way or being so distorted as to bind the pawls, which operate only by the force of gravity on their own slight mass.

Referring to Figs. 3 and 7, the spool 19 of the present invention is provided with pivots 31 for the pawls which are integral with the body of the spool and formed from the material thereof. These pivots are of such length as to extend well above the upper surface of the pawls when they are in place so as to provide a body of material which can be so distorted or enlarged as to retain the pawls in place.

A preferred method of making such a spool is illustrated in Figs. 4 through 7 wherein are shown some of the steps in forming integral, drawn, tubular pivots in a spool formed from sheet metal such as steel. The manufacture may advantageously be carried out in a press having multiplestation dies which first form a blank having the cross section shown in Fig. 4, the metal being pressed up, as shown at $a$ to a height somewhat less than the length of the desired pivots. By pressing up a substantial body of metal, as shown, the thickness of the stock is substantially maintained in the drawn portions. The drawn portions $b$ in Fig. 5 are somewhat increased in height but contracted in diameter and as shown at $c$ in Fig. 6 they are still further contracted. The portions $c$ are nearly in the form of the finished pivots except that they are not squared with the stock at their roots $r$ and still have closed ends. Fig. 7 shows the final form $d$ of the pivots in which they are given a clean right-angle junction with the spool and perforated at the top. Simultaneously with one or more of the finishing operations on the pivots, the spool may be completed by formation of the flange 35, the center opening 36 and the dished center portion 37. The total number of die operations, some of which are shown in the drawings, will vary with the material worked on and with other operations which it may be desired to perform on the spool. It has been found that perfect pivots as shown in Figs. 3 and 7 can be formed in five or six steps when operating on steel.

It will be noted that the wall of the finished tubular pivot, formed as above described, is substantially of the same thickness as the original stock from which it was formed. This metal has been subjected to a substantial amount of cold working which hardens and toughens it thus making a strong and wear resisting pivot. Breakdown tests in which torque was applied to the spear 22, rotating the hub 24 to press against the pawl 30 and pivot 31 (as shown by the arrow, Fig. 2) demonstrated that tubular pivots like those just described, of no greater diameter than the rivets now commonly used, remained unaffected and in perfect functioning order at pressures which twisted the spear in two.

Referring to Figs. 3 and 8, it will be seen that the assembly of the pawls to the spool is greatly simplified as it is unnecessary to handle any rivets. The pawls 30 are simply dropped over the pivots 31, which are conveniently beveled at the top, and the pivots are then flared or expanded as shown in Fig. 8 by any appropriate tool operating in an obvious and well-known manner. This construction has also made it possible for the first time to carry out the assembly of the spool and pawls by automatic machinery which feeds the pawls onto the pivots and heads the pivots to secure them in place, thus greatly reducing the unit cost of manufacture.

It is to be understood that only one form of the invention has been described herein by way of illustration and that it is capable of being practiced in other ways without departing from the teachings hereof. What I believe to be new and seek to have covered by Letters Patent is defined in the claims.

What is claimed is:

1. A pawl-carrying spool assembly for a spring shade roller comprising a sheet metal spool, integral drawn tubular pivots formed from the metal of the spool, said pivots being open at their free ends, pawls freely mounted for rotation on said pivots, the edges of the open free ends of said pivots being outwardly flared to secure the pawls against removal.

2. A pawl-carrying spool for use in a spool assembly for a spring shade roller, said spool comprising integral drawn tubular pivots formed from the metal of the spool, the free ends of said pivots being perforated and externally beveled, whereby the assembly of pawls on said pivots is facilitated.

3. The method of making a spool assembly for a spring shade roller of the type provided with a notched hub and pawls carried by a spool adapted for rotation relative to the hub, wherein the pawls fall by gravity to engage said hub to prevent rotation of the roller, which comprises forming said spool from sheet metal by cold forming operations drawing up and forming from the metal of the spool in a plurality of steps tubular open-ended pivots, assembling pawls on said pivots, and thereafter outwardly flaring the edges of the open ends of said pivots to rotatably secure the pawls thereon.

4. The method of making a pawl-carrying spool for a spring shade roller of the type having a notched hub and pawls pivoted on the spool and adapted, under the influence of gravity, to engage said hub to prevent rotation of the roller, which comprises forming said spool from a sheet metal blank by a plurality of cold drawing operations, drawing up from the metal of the spool tubular open-ended pivots for pawls, the initial drawing operations raising from the blank bodies of metal of circular cross section which have diameters in excess of those of the finished pivots and subsequent drawing operations reducing the diameters of said bodies.

ANTHONY MORPETH.

REFERENCES CITED

The following references are of record in the file of this patent:

UNITED STATES PATENTS

| Number | Name | Date |
| --- | --- | --- |
| 2,024,142 | Burns | Dec. 17, 1935 |
| 2,220,135 | Wardell | Nov. 5, 1940 |